(No Model.)
O. H. P. SHROYER.
TRUCK FOR MOVING REAPERS.
No. 265,988. Patented Oct. 17, 1882.
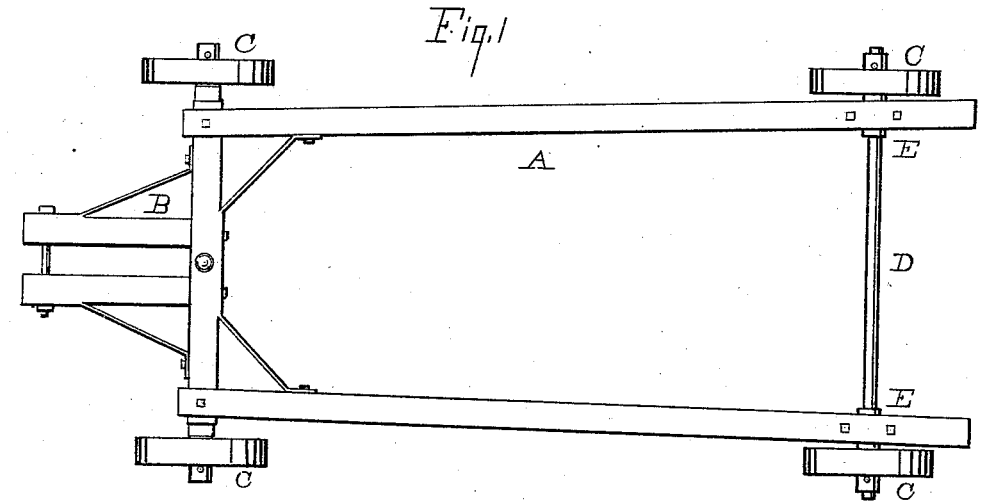
Fig. 1
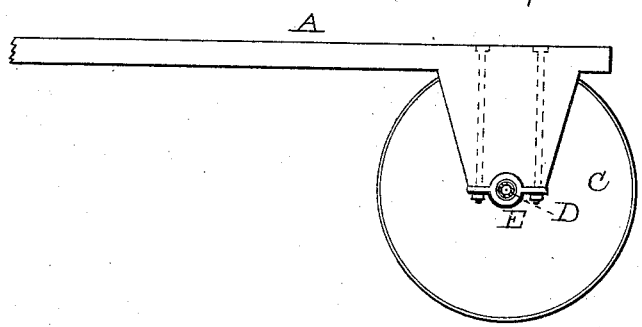
Fig. II
WITNESSES:
John Trautmann
Leopold Leibold
INVENTOR
Oliver H. P. Shroyer
BY B. Pickering,
ATTORNEY

UNITED STATES PATENT OFFICE.

OLIVER H. P. SHROYER, OF DAYTON, OHIO.

TRUCK FOR MOVING REAPERS.

SPECIFICATION forming part of Letters Patent No. 265,988, dated October 17, 1882.

Application filed September 1, 1882. (No model.)

*To all whom it may concern:*

Be it known that I, OLIVER H. P. SHROYER, a citizen of the United States, residing at Dayton, in the county of Montgomery and State of Ohio, have invented a new and useful Self-Binding-Reaper Truck, of which the following is a specification.

My invention relates to a truck the rear wheels of which have hollow spindles bolted to the rails of the frame and connected by an axle which occupies the orifices of the spindles, and to which it is held by pins, and from which it is therefore readily removable. The object is to load conveniently a self-binding reaper, which is done by removing the axle and running the truck under the machine astride the driving-wheel, then replacing the axle, lower the machine, and the loading is completed. I attain the object by the mechanism illustrated in the accompanying drawings, in which—

Figure 1 is a top view of the truck. Fig. 2 is a view from the inside of the rear part of the frame.

The frame is represented at A, and consists of two rails securely attached to the bolster at the front end, and at the rear the rails are bolted to the hollow spindles E, with intervening blocks to support the same above the peripheries of the wheels. The truck-wheels C support the frame, and are of wood, of small diameter, broad, and bound with an iron tire. The front axle, B, has hounds suitable for the attachment of a tongue. The spindles E are of cast-iron, with central orifices to receive the rear axle or tie-rod, and having side flanges by which they are bolted to the frame, as shown in Fig. 1. The tie-rod D, corresponding to the rear axle, is preferably of tubular iron, and is fastened to the spindles by the same pins which serve as linchpins for the wheels. This rod serves to maintain the wheels in a vertical position and to bind the rear of the frame.

In using the truck for the purpose designed— viz., that of conveying self-binding reapers— the operation is thus: The reaper is first raised by a device peculiar to itself, the tie-rod of the truck is removed, and the same is run under the machine astride the master-wheel, the tie-rod is replaced, the reaper lowered, and the loading is completed.

Having fully described my invention, what I claim, and desire to secure by Letters Patent, is—

The hollow flanged spindle E and tie-rod D, in combination with a truck-frame, substantially as set forth.

OLIVER H. P. SHROYER.

Witnesses:
B. PICKERING,
SUMNER T. SMITH.